United States Patent
Ajgaonkar

(10) Patent No.: US 12,260,196 B2
(45) Date of Patent: *Mar. 25, 2025

(54) SCALABLE CROSS-BOUNDARY EDGE FRAMEWORK

(71) Applicant: Insight Direct USA, Inc., Chandler, AZ (US)

(72) Inventor: Amol Ajgaonkar, Chandler, AZ (US)

(73) Assignee: Insight Direct USA, Inc., Chandler, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/675,400

(22) Filed: May 28, 2024

(65) Prior Publication Data

US 2024/0311108 A1 Sep. 19, 2024

Related U.S. Application Data

(63) Continuation of application No. 17/953,850, filed on Sep. 27, 2022, now Pat. No. 12,026,486.

(51) Int. Cl.
*G06F 8/41* (2018.01)
(52) U.S. Cl.
CPC .................................... *G06F 8/41* (2013.01)
(58) Field of Classification Search
None
See application file for complete search history.

(56) References Cited

U.S. PATENT DOCUMENTS

| | | |
|---|---|---|
| 5,909,183 A | 6/1999 | Borgstahl et al. |
| 6,069,896 A | 5/2000 | Borgstahl et al. |
| 6,487,170 B1 | 11/2002 | Chen et al. |
| 6,487,180 B1 | 11/2002 | Borgstahl et al. |
| 6,826,607 B1 | 11/2004 | Gelvin et al. |
| 6,978,313 B1 * | 12/2005 | Pietrowicz ........... H04Q 3/0025 379/221.13 |
| 7,243,356 B1 | 7/2007 | Saulpaugh et al. |
| 7,676,539 B2 | 3/2010 | Jhoney et al. |

(Continued)

FOREIGN PATENT DOCUMENTS

| | | |
|---|---|---|
| CN | 114980148 A | 8/2022 |
| WO | 2001090883 A2 | 11/2001 |

*Primary Examiner* — Philip Wang
(74) *Attorney, Agent, or Firm* — Kinney & Lange, P.A.

(57) ABSTRACT

A build of a software solution that is cooperatively performed is automated. A broadcasting computing entity broadcasts an announcement of the functional operation of which the broadcasting computing entity is capable. Each of a plurality of listening computing entities connected to the network receives the announcement and compares the functional operation with a list of operational needs. After determining itself in need of performance of such a functional operation, a subscribing one of the plurality of listening computing entities transmits a response to the request indicating subscription to the output of the functional operation. The broadcasting computing entity then performs the functional operation, thereby generating and transmitting to the subscribing one of the plurality of listening computing entities the output of the functional operation. The subscribing one of the plurality of listening computing entities then performs an action using the output of the functional operation received.

20 Claims, 9 Drawing Sheets

(56) References Cited

U.S. PATENT DOCUMENTS

| | | |
|---|---|---|
| 7,735,060 B2 | 6/2010 | Harvey et al. |
| 8,095,923 B2 | 1/2012 | Harvey et al. |
| 8,135,796 B1 | 3/2012 | Slaughter et al. |
| 2003/0105887 A1 | 6/2003 | Cox et al. |
| 2004/0061890 A1* | 4/2004 | Ferlitsch .................. G06K 1/00 358/1.15 |
| 2007/0274226 A1 | 11/2007 | Tillotson |
| 2008/0010631 A1 | 1/2008 | Harvey et al. |
| 2012/0151292 A1* | 6/2012 | Rowstron ............. G06F 9/5066 714/748 |
| 2014/0379921 A1* | 12/2014 | Morley .................. H04L 67/10 709/226 |
| 2015/0309948 A1* | 10/2015 | Kotta ...................... G06F 13/28 710/308 |
| 2016/0277407 A1* | 9/2016 | Nakashima ............. G06F 21/00 |
| 2016/0295390 A1* | 10/2016 | Gonzalez De Langarica .............. H04W 4/16 |
| 2016/0352782 A1 | 12/2016 | Patil et al. |
| 2018/0152506 A1 | 5/2018 | Simó et al. |
| 2019/0116128 A1 | 4/2019 | Guo et al. |
| 2019/0123967 A1* | 4/2019 | Dotchkoff ............... H04W 4/70 |
| 2019/0140919 A1 | 5/2019 | Smith et al. |
| 2019/0141119 A1 | 5/2019 | Bernat et al. |
| 2019/0230002 A1 | 7/2019 | Bernat et al. |
| 2020/0153921 A1 | 5/2020 | Kolluri Venkata Sesha et al. |
| 2020/0169926 A1* | 5/2020 | Hwang ................. H04W 80/08 |
| 2020/0374974 A1 | 11/2020 | Sun et al. |
| 2022/0078252 A1 | 3/2022 | Nixon et al. |
| 2022/0083387 A1 | 3/2022 | Guevin et al. |
| 2022/0131776 A1* | 4/2022 | Matsumoto ......... H04L 41/0816 |
| 2023/0275777 A1* | 8/2023 | Ajgaonkar .......... H04L 12/1877 370/329 |

\* cited by examiner

SCALABLE CROSS-BOUNDARY EDGE FRAMEWORK

CROSS-REFERENCE TO RELATED APPLICATION

This application is a continuation of U.S. application Ser. No. 17/953,850, filed Sep. 27, 2022, and entitled "SCALABLE CROSS-BOUNDARY EDGE FRAMEWORK," the disclosure of which is hereby incorporated by reference in its entirety.

BACKGROUND

Automated systems are used in a wide variety of applications, such as, for example, controlling industrial processes, monitoring people, surveilling property, evaluating health conditions of people or equipment, providing automated control of homes or devices, etc. Such automated systems can include various interconnected modules and/or hardware components, such as, for example: sensors, transducers, actuators, cameras, and other various hardware components. Coordination and control of such interconnected modules and/or hardware components is performed using one or more computing entities. Cloud-based computing entities, local computing entities, or some combination thereof can be programmed to provide such coordination and control of these interconnected modules and/or hardware components of automated systems.

In some embodiments, an automated system or subsystem can be arranged as local devices centrally connected via at least one hub (e.g., an IoT hub). Edge computing approaches to such automated systems can centralize local collections (e.g., subsystems) of interconnected modules and/or hardware devices around edge hubs that serve as a local nexus for distributed computation and information storage closer to those subsystem modules, and as a gateway to cloud-based (i.e., remote) services provided through the hub. Such local subsystems can operate independently or semi-independently from their parent hub, when isolated.

In many applications, edge systems (e.g., IoT edge systems) can simultaneously provide many of the benefits of cloud-based computing solutions while retaining the capacity for independent local operation and reducing inter-network bandwidth requirements. By contrast, substantially fully-cloud-based systems use local devices that perform minimal local processing, and offload more complex processing tasks and tasks involving data aggregated from multiple devices to a nonlocal cloud service. Such approaches can become burdensome as the volume of data involved increases. Edge systems instead preferentially perform most routine processing tasks within the local subsystem, with an edge hub coordinating communications between local devices and handling many processing tasks, including processing of data aggregated from multiple devices within the local subsystem. The edge hub can communicate with cloud systems for remote subsystem access, remote and/or distributed data persistence, high level (i.e., multi-subsystem) control and analytics, and other purposes.

Development frameworks facilitate developers to generate code that coordinates and controls the interconnected modules and/or hardware components of automated systems.

SUMMARY

Apparatus and associated methods relate to a system to automate building a software solution that is cooperatively performed. The system includes a plurality of listening computing entities connected to a network and a broadcasting computing entity connected to the network. The broadcasting computing entity is configured to broadcast, to each of the plurality of listening computing entities via the network, an announcement of a functional operation of which the broadcasting computing entity is capable. Each of the plurality of listening computing entities is configured to: i) receive the announcement of the functional operation of which the broadcasting computing entity is capable; and ii) compare the functional operation of which the broadcasting computing entity is capable with a list of operational needs. In response to the functional operation being listed in the list of operational needs, a subscribing one of the plurality of listening computing entities is further configured to transmit a response to the announcement received indicating subscription to an output of the functional operation of which the broadcasting computing entity is capable. The broadcasting computing entity is further configured to: i) receive, from the subscribing one of the plurality of listening computing entities, the response indicating subscription to the output of the functional operation of which the broadcasting computing entity is capable; ii) perform the functional operation of which the broadcasting computing entity is capable, thereby generating the output of the functional operation; and iii) transmit the output of the functional operation performed by the broadcasting computing entity. The subscribing one of the plurality of listening entities is further configured to: i) receive, from the broadcasting computing entity, the output of the functional operation performed by the broadcasting computing entity; and ii) perform an action using the output of the functional operation performed by the broadcasting computing entity, thereby cooperatively performing at least a part of the software solution.

Some embodiments relate to a method to automate building a software solution that is cooperatively performed. In the method, a broadcasting computing entity is connected to a network. An announcement of a functional operation of which the broadcasting computing entity is capable is broadcasted by the broadcasting computing entity to each of a plurality of listening computing entities connected to the network. The announcement of the functional operation of which the broadcasting computing entity is capable is received by each of the plurality of listening computing entities. The functional operation of which the broadcasting computing entity is capable is comparing with a list of operational needs by each of the plurality of listening computing entities. In response to a subscribing one of the plurality of listening computing entities finding the functional operation being listed in the list of operational needs, a response to the announcement received indicating subscription to an output of the functional operation of which the broadcasting computing entity is capable is transmitted. The response indicating subscription to the output of the functional operation of which the broadcasting computing entity is capable is received by the broadcasting computing entity. The functional operation is performed by the broadcasting computing entity, thereby generating the output of the functional operation. The output of the functional operation performed is then transmitted by the broadcasting computing entity. The output of the functional operation performed by the broadcasting computing entity is received by the subscribing one of the plurality of listening computing entities. An action using the output of the functional operation performed by the broadcasting computing entity is then performed by the subscribing one of the plurality of listening computing entities, thereby cooperatively performing at least a part of the software solution.

DETAILED DESCRIPTION

A build of a software solution that is cooperatively performed is automated. A broadcasting computing entity selects a selected set of functional operations from one or more sets of functional operations associated with the software solution and then broadcasts a request to perform each of the functional operations in the selected set. Each of a plurality of listening computing entities connected to the network receives the request and determines capability of performing each of the functional operations in the selected set. After determining itself capable, a capable one of the plurality of listening computing entities transmits a response to the request indicating such capability, and then performs each of the functional operations in the selected set, thereby generating and transmitting to the broadcasting computing entity the output of the selected set of functional operations. The broadcasting computing entity then performs an action using the output of the functional operation received.

When a collection of automated components (e.g., sensors, transducers, cameras, controllers, gateways, etc.) is deployed to perform various tasks corresponding to a specific application (i.e., a specific use case), such collection of automated components communicate with one another so as to cooperatively perform the various tasks corresponding to the application. The Application and/or some such tasks can often cooperatively be performed by multiple threads of a single automated component (i.e., scaling up of the task) and/or across multiple automated components of the collection (i.e., scaling out of the task). Such scaling up and scaling out of such tasks can be automated freeing a developer from having to write custom code for such scaling processes. Furthermore, some applications and/or tasks can involve some level of cooperation amongst multiple automated components. For example, surveilling property can involve capturing imagery via a camera, and then using a computing entity to perform image analysis, so as to determine if a person is discernable within the captured imagery. Such cooperation amongst multiple automated components can also be automated, again freeing the developer from having to write custom code for such cooperative applications and/or tasks. Herein, such activities, as described immediately above, are called automated building of a software solution for a specific intention that is cooperatively performed amongst a plurality of computing entities.

Figure 1:
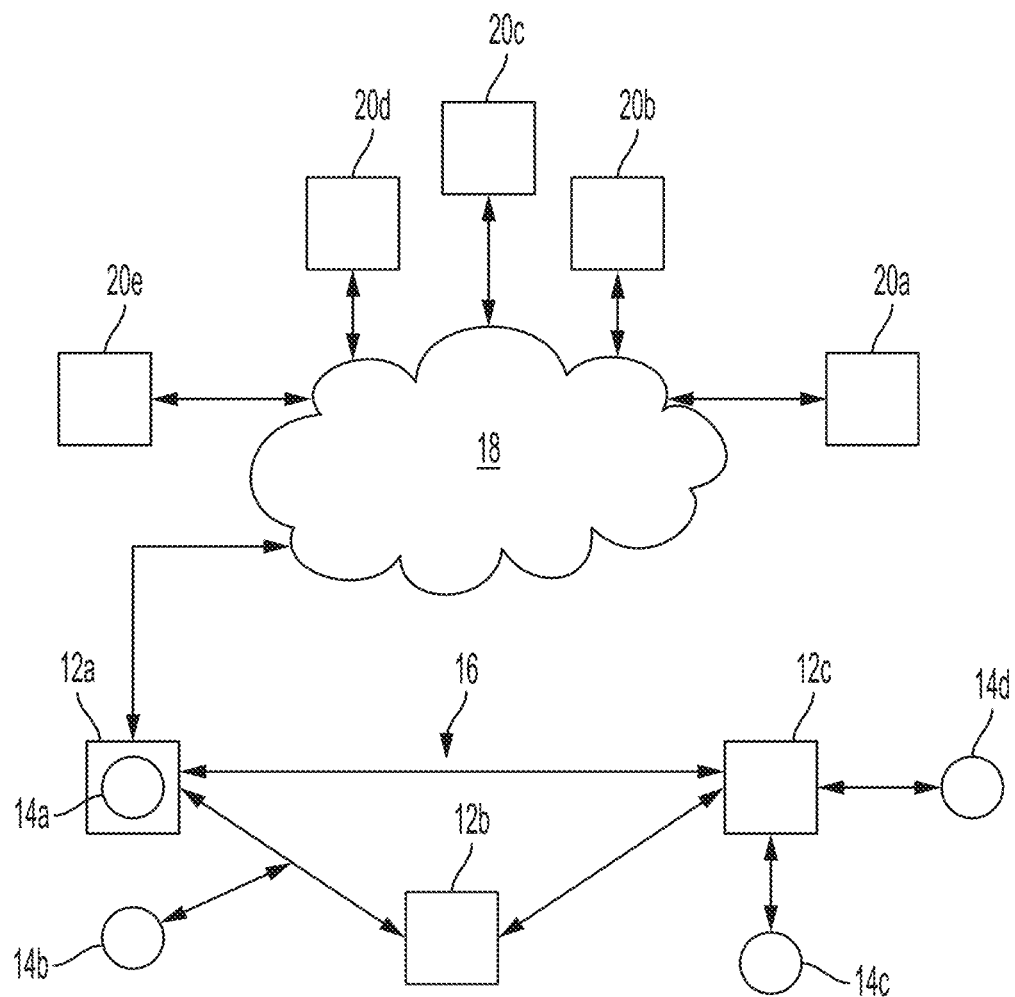
FIG. 1 is a schematic diagram of a system for to automating building a software solution for a specific intention that is cooperatively performed amongst a plurality of computing entities.

FIG. 1 is a schematic diagram of a system for automating building a software solution for a specific intention that is cooperatively performed amongst a plurality of computing entities. In FIG. 1, automated system 10 includes various automated components—local computing entities 12a-12c and local modules 14a-14d. Local modules 14a-14d can be devices that interact with the physical world, such as, for example, sensors, actuators, transducers, cameras, etc. Typically, local modules 14a-14d are devices that convert between a signal and a physical parameter. Computing entities 12a-12c can be state machines or processors that perform execute instructions contained in computer readable memory (e.g., computer code), such as, for example, controllers, computers, gateways, etc. In the FIG. 1 depiction, local computing entity 12a includes local module 14a. Such a device can be, for example, a smart sensor that has computing capabilities. Automated system 10 has been deployed to perform one or more tasks corresponding to a specific use case (i.e., a specific application). Use cases are essentially applications for which the local modules 14a-14d and local computing entities 12a-12c have been deployed. Various use cases correspond to various applications for which local modules 14a-14d and local computing entities 12a-12c can be configured to address. For example, use cases can include monitor a cold-temperature storage facility, operating a chemical processing facility, controlling a final product assembly line, providing security monitoring of a facility, monitoring health of a population, or myriad other applications that have tasks, which can be automated using local modules and local computing entities, such as those depicted in FIG. 1.

Local modules, such as local modules 14a-14d, can be any device that facilitates such tasks corresponding to the use case for which local modules 14a-14d are deployed. For example, for a use case of monitoring a cold-storage facility, local modules 14a-14d might include one or more temperature sensor. For a use case of surveilling a property, local modules 14a-14d might include a camera, a thermal-imaging camera, or a motion detector, for example. For a use case of controlling a chemical processing facility, local modules 14a-14d might include flow controllers, heaters, valve controllers, pressure sensors, pH sensors, etc. For a use case of controlling a final product assembly line, local modules 14a-14d might include robotic arms, cameras, conveyor belts motors, etc. For these and many other use cases, many tasks that are cooperatively performed amongst a plurality of computing entities can be built automatically as will be described in detail below.

In addition to local communications amongst local modules 14a-14d and local computing entities 12a-12c via local network 16, automated system 10 can communicate via cloud 18 with cloud-based computing entities 20a-20e, which can be configured to perform various back-end services. Such back-end services can include, for example, configuration services, organization services, notification services, location/device services, alert services, telemetry services, device-cloud interface, synchronization services, database services (e.g., Cosmos database, SQL database, etc.), IoT hub services, front-end User Interface (UI) services, health monitoring services, etc. Automated building of a software solution for a specific intention that is cooperatively performed amongst a plurality of computing entities can include tasks cooperatively performed amongst combinations of local computing entities 12a-12c and cloud-based computing entities 20a-20c (e.g., combinations of two or more local computing entities 12a-12c only, combinations of two or more cloud-based computing entities 20a-20e only, or combinations of one or more local computing entities 12a-12c and one or more cloud-based computing entities 20a-20c).

In FIG. 1, local computing entities 12a-12c and cloud-based computing entities 20a-20e variously execute software so as to perform various tasks or functions of or related to automated system 10. The various tasks or functions of or related to automated system 10 can require various levels of coordination between two or more of local computing entities 12a-12c and cloud-based computing entities 20a-20c. For example, some back-end services might need little coordination between local computing entities 12a-12c and cloud-based computing entities 20a-20c. Higher levels of coordination can provide beneficial performance for other tasks or functions of or related to automated system 10, especially for functions and/or operations locally performed by local computing entities 12a-12c using local modules 14a-14d. Thus, although tasks or functions can be cooperatively performed by local computing entities and cloud-based computing entities, below will be described only tasks or functions cooperatively performed by local computing entities 12a-12c.

To facilitate such coordination of functions and/or operations locally performed by local computing entities 12a-12c and local modules 14a-14d, local computing entities 12a-12c have been programmed so to facilitate such coordination of functions and/or operations. Such coordination of functions and/or operations can be performed in various manners. Described below are two general manners describing methods and systems to automate building of a software solution that is cooperatively performed. First will be described systems and methods in which broadcasting computing entity 12a broadcasts an announcement of a performance capability of a functional operation and then listening computing entities 12b and 12c can request broadcasting computing entity 12a to perform such a functional operation. Second will be described systems and methods in which broadcasting computing entity 12a broadcasts a request for one of listening computing entities 12b and 12c to perform functional operation that broadcasting computing entity 12a wants performed on his behalf. Thus, the two general manners of automating building of a software solution that is cooperatively performed can be called: i) broadcasting-capabilities manner; and ii) broadcasting-needs manner.

In one embodiment exemplifying the broadcasting-capabilities manner to automate building of a software solution that is cooperatively performed, local computing entity 12a connects to local network 16, to which local computing entities 12b and 12c are also connected. Local computing entity 12a broadcasts a specific intention via local network 16. The specific intention includes an announcement of a performance capability of a functional operation that local computing entity 12a can provide. Local computing entity 12a can be considered a broadcasting computing entity by virtue of its broadcast of its specific intention. The specific intention broadcast by broadcasting computing entity 12a can be any capability of which it is capable of doing. For example, the broadcasting computing entity can broadcast: i) any capabilities for which it has been programmed to perform; and/or ii) any capabilities associated with local module 14a with which it interfaces. Local computing entities 12b and 12c listen to the broadcast of local computing entity 12a. For example, if local module 14a is a sensor, broadcasting computing entity can broadcast a capability of providing data indicative of a metric sensed by local module 14a. Local broadcasting module might be programmed to provide various data processing functions upon such data indicative of a sensed parameter, such as, for example, filtering, histogramming, etc.

Local computing entity 12b perhaps has been programmed to listen for specific intentions broadcast from broadcasting computing entities. Local computing entity 12b can be considered a listening computing entity by virtue of its listening for specific intentions broadcast by broadcasting computing entities. In some embodiments, listening computing entity 12b can compare the specific intentions broadcast with one or more specific needs listed in a list of operational needs. In other embodiments, listening computing entity 12b assess whether listening computing entity 12b can benefit from the specific intentions broadcast in different manners. In either case, listening computing entity 12b transmits a communication in response to determining that listening computing entity 12b could use the specific intention broadcast by broadcasting computing entity 12a.

Broadcasting computing entity 12a receives the response to the specific intention from a listening computing entity 12b via local network 16. The response can include a subscription to an output of the functional operation, for example. Broadcasting computing entity 12a performs the functional operation declared in the specific intention broadcast and generates an output of the functional operation. Broadcasting computing entity 12b provides the output generated to the listening computing entity. In some embodiments such provision of the output to subscribing computing entities is performed using publication/subscription engines.

The above-described system and/or method of automating building a software solution can be used using network configurations that are different from that depicted in FIG. 1. For example, local modules 14a-14d can be directly connect to local network 16, directly connect to one or more of computing entities 12a-12c, and/or connect via cloud 18 to local computing entities 12a-12c and cloud-based computing entities 20a-20e. Such connections can be wired or wireless. Such connections can use any available networking protocols.

In another embodiment exemplifying the broadcasting-needs manner to automate building of a software solution that is cooperatively performed, local computing entity 12a connects to local network 16, to which local computing entities 12b and 12c are also connected. Local computing entity 12a selects a functional operation from a set of one or more functional operations associated with the software solution, and then broadcasts a request to perform the functional operation selected. Broadcasting computing 12a entity might be incapable of performing such a functional operation as the one selected, or broadcasting computing entity 12a might simply be operating at near workload capacity and thus would like to offload some functional operations to listening computing entities 12b and 12c. Listening computing entities 12b and 12c listen to the broadcast of local computing entity 12a, thereby receiving the request to perform the functional operation. Each of listening computing entities 12b and 12c then determines capability of performing the functional operation, wherein a capable one of the plurality of listening computing entities 12b and 12c is one (or more) that determines itself capable of performing the functional operation. Such capability can be determined by comparing the functional operation requested with a list of functional operations of which listening computing entity 12b and/or 12c is capable, for example. Another consideration for determining the capability of performing the functional operation is workload of the listening computing entity. For example. If listening entity 12b and/or 12c is operating at a workload that is greater than a predetermined percentage of its full workload capacity, such listening computing entity 12b and/or 12c will not determine itself capable of performing the functional operation requested.

Listening computing entity 12b perhaps has determined itself capable of performing the functional operation requested and is therefore a capable one of listening computing entities 12b and 12c. Listening computing entity 12b transmits a communication in response to determining that listening computing entity 12b is capable of performing the functional operation requested. Broadcasting computing entity 12a receives the response to the request to perform the functional operation from a listening computing entity 12b via local network 16. The response can include information regarding publication of and subscription to an output of the functional operation, for example. Listening computing entity 12b then performs the functional operation requested and generates an output of the functional operation. Listening computing entity 12b provides the output generated to broadcasting computing entity 12a. In some embodiments such provision of the output to subscribing computing entities is performed using publication/subscription engines.

The above-described systems and/or methods of automating building a software solution can be used using network configurations that are different from that depicted in FIG. 1. For example, local modules 14a-14d can be directly connect to local network 16, directly connect to one or more of computing entities 12a-12c, and/or connect via cloud 18 to local computing entities 12a-12c and cloud-based computing entities 20a-20e. Such connections can be wired or wireless. Such connections can use any available networking protocols.

Figure 2:
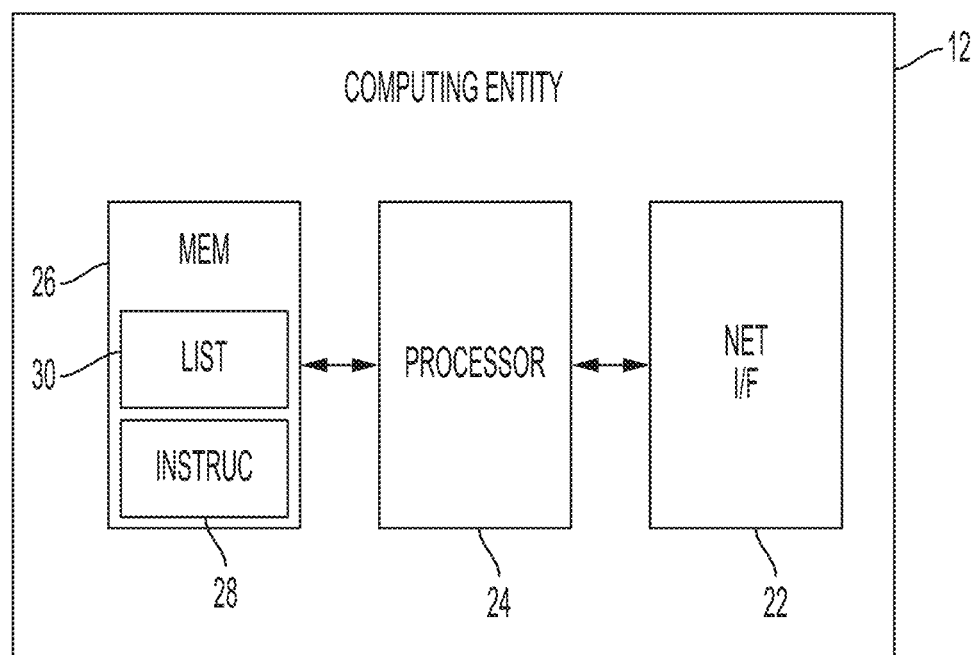
FIG. 2 is a block diagram of a computing entity that coordinates performance of a task with another computing entity.

FIG. 2 is a block diagram of a computing entity that coordinates performance of a task with another computing entity. In FIG. 2, computing entity 12 includes network interface 22, processor 24, computer readable memory 26 containing instructions 28 that, when executed by processor 24 cause computing entity 12 to perform various steps for automating building a software solution for a specific intention that is cooperatively performed amongst a plurality of computing entities. Examples of computing entity 12 can include a smart sensor or actuator, an edge computer, a gateway computer, etc. Computing entity 12, as disclosed in the FIG. 2 embodiment, can be used for both broadcasting a specific intention as well as listening to broadcasts from other computing entities. Local computing entity 12 can be any of those local computing entities depicted in FIG. 1, for example (i.e., local computing entities 12a-12c).

In an embodiment exemplifying the broadcasting-capabilities manner to automate building of a software solution that is cooperatively performed, processor 24 can read program instructions 28 from computer readable memory 26, which cause computing entity 12 to: i) connect to a network; ii) broadcast the specific intention which includes announcing performance capability of a functional operation by the broadcasting computing entity; iii) receive a response to the specific intention from a listening computing entity via the network, each response including a subscription to an output of the functional operation; iv) generate the output of the functional operation; and v) provide the output generated to the listening computing entity. When performing the above operations, computing entity 12 is operating as a broadcasting computing entity. Examples of processor 24 can include any one or more of a microprocessor, a controller, a digital signal processor (DSP), an application specific integrated circuit (ASIC), a field-programmable gate array (FPGA), or other equivalent discrete or integrated logic circuitry.

Computing entity 12 can also operate as a listening computing entity for such a broadcasting-capability solution. When operating as a listening computing entity, processor 24 can read program instructions 28 from computer readable memory 26, which cause computing entity 12 to: i) connect to a network; ii) listen for a specific intention broadcast by a broadcasting computing entity; ii) compare the functional operation included in the specific intention broadcast by the broadcasting computing entity with a list of operational needs; iv) subscribe to an output of the functional operation performed by the broadcasting computing entity in response to the functional operation being listed in the list of operational needs; and v) receive the output of the functional operation performed by the broadcasting computing entity).

In another embodiment exemplifying the broadcasting-needs manner to automate building of a software solution that is cooperatively performed, processor 24 can read program instructions 28 from computer readable memory 26, which cause computing entity 12 to: i) select a functional operation from a set of one or more functional operations associated with the software solution; ii) broadcast a request for a listening computing entity to perform the functional operation selected; iii) receive a response indicating capability of performing the functional operation from the listening computing entity; iv) receive an output of the functional operation performed by the listening computing entity; and v) perform an action using the output of the functional operation received, thereby cooperatively performing at least a part of the software solution. When performing the above operations, computing entity 12 is operating as a broadcasting computing entity. Examples of processor 24 can include any one or more of a microprocessor, a controller, a digital signal processor (DSP), an application specific integrated circuit (ASIC), a field-programmable gate array (FPGA), or other equivalent discrete or integrated logic circuitry.

Computing entity 12 can also operate as a listening computing entity for such a broadcasting-needs solution. When operating as a listening computing entity, processor 24 can read program instructions 28 from computer readable memory 26, which cause computing entity 12 to: i) receive the request to perform the functional operation from a broadcasting computing entity; and ii) determine capability of the system of performing the functional operation. If the system is determined capable of performing the functional operation, then the processor 24 can read further program instructions 28 from computer readable memory 26, which cause computing entity 12 to: iii) transmit a response to the request received indicating capability of performing the functional operation; iv) perform the functional operation, thereby generating an output of the functional operation; and v) transmit the output of the function operation performed, thereby cooperatively performing at least a part of the software solution Computer-readable memory 26 can be configured to store information obtained and/or computed during operation of computing entity 12. Computer-readable memory 26, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can change over time (e.g., in RAM or cache). In some examples, computer-readable memory 26 is a temporary memory, meaning that a primary purpose of computer-readable memory 26 is not long-term storage. Computer-readable memory 26, in some examples, is described as volatile memory, meaning that computer-readable memory 26 do not maintain stored contents when power to IoT device interface system 36 is turned off. Examples of volatile memories can include random-access memories (RAM), dynamic random-access memories (DRAM), static random-access memories (SRAM), and other forms of volatile memories. In some examples, computer-readable memory 26 is used to store program instructions for execution by processor 24. Computer-readable memory 26, in one example, is used by software or applications running on computing entity 12 (e.g., a software program performing such scaling up or scaling out of tasks) to temporarily store information during program execution.

In some examples, computer-readable memory 26 can also include one or more computer-readable storage media. Computer-readable memory 26 can be configured to store larger amounts of information than volatile memory. Computer-readable memory 26 can further be configured for long-term storage of information. In some examples, computer-readable memory 26 includes non-volatile storage elements. Examples of such non-volatile storage elements can include magnetic hard discs, optical discs, flash memories, or forms of electrically programmable memories (EPROM) or electrically erasable and programmable (EEPROM) memories.

Network interface 22, in one example, is configured to facilitate communication between computing entity 12 and external devices via one or more networks, such as one or more wireless or wired networks or both. Network interface 22 can include a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB).

Figure 3:
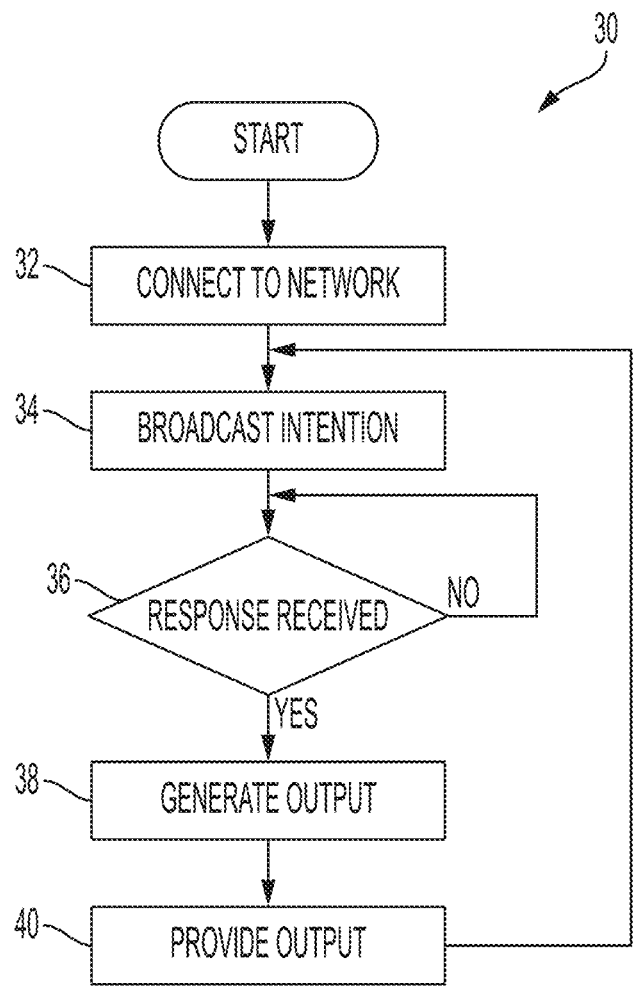
FIG. 3 is a flow chart of an embodiment of a method for providing a functional operation for other computing entities.

FIG. 3 is a flow chart of an embodiment of a method for providing a functional operation for other computing entities. In FIG. 3, method 30 is disclosed from the perspective of a broadcasting computing entity, such as broadcasting computing entity 12a depicted in FIG. 1. Method 30 begins at step 32, where broadcasting computing entity connects to local network 16. Then, at step 34, broadcasting computing entity 12a broadcasts, via local network 16, the specific intention. The specific intention broadcast includes announcing performance capability of a functional operation by broadcasting computing entity 12a. In some embodiments, the specific intention can further include instructions for a listening entity to communicate with broadcasting computing entity 12a. In some embodiments, broadcasting computing entity 12a encrypts the specific intention using an encryption algorithm known to both broadcasting computing entity 12a and listening computing entities.

At step 36, broadcasting computing entity 12a waits to receive a response to the specific intention from a listening computing entity via the network. A response will include a subscription to an output of the functional operation. If a response is received, method 30 advances to step 38, where broadcasting computing entity 12a generates the output of the functional operation. At step 40, broadcasting computing entity 12a provides the output generated to the listening computing entity. After providing the output at step 40, method 30 returns to step 34 and broadcasts the specific intention again. Such periodic broadcasting of its intention permits listening computing entities that are later connected to the network to find broadcasting computing entities that provide operations that are on their list of operational needs. Such periodic broadcasting also permits subscribing computing devices with periodic indicators that the broadcasting computing entity to which they subscribe is still operating and online. Should these periodic broadcasts cease to be heard, such listening devices can search for other providers or assume responsibility for performing such operations themselves.

In some embodiments, the output of the functional operation is/are based on input data. Such input data can be provided by a listening computing entity or a local module, for example. In embodiments in which input data is provided by a listening computing entity, broadcasting computing entity 12a receives such input data from the listening computing entity via the network. Then, broadcasting computing entity 12a computes the output based on the input data received from the listening computing entity. Different listening computing entity can provide different input data to broadcasting computing entity 12a so as to have broadcasting computing entity 12a compute different outputs for each of these different sets of input data. In such an embodiment, broadcasting computing entity 12a provides each input computing entity with an output corresponding to the input data provided thereby.

Using the methods of method 30, broadcasting computing entity 12a performs a part of the software solution in cooperation with the listening computing entity. The part performed by broadcasting computing entity 12a includes, at least, performance of the functional operation. Listening computing entity then uses the output of the functional operation to perform an action that is part of the software solution.

Figure 4:
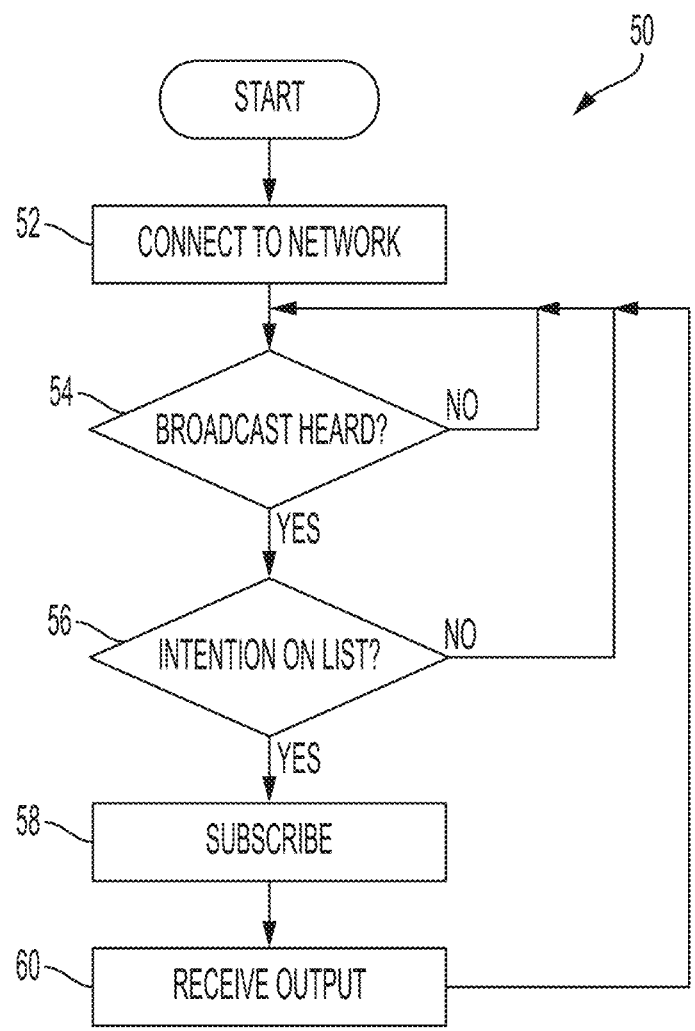
FIG. 4 is a flow chart of an embodiment of a method for subscribing to a functional operation for other computing entities.

FIG. 4 is a flow chart of an embodiment of a method for subscribing to a functional operation for other computing entities. In FIG. 4, method 50 is disclosed from the perspective of a listening computing entity, such as listening computing entity 12b depicted in FIG. 1. Method 50 begins at step 52, where listening computing entity 12b connects to a network. At step 54 listening computing entity 12b listens, via the network, for a specific intention broadcast by a broadcasting computing entity. The specific intention will include an announcement of a performance capability of a functional operation by the broadcasting computing entity. In some embodiments, the specific intention can further include instructions for listening entity 12b to communicate with the broadcasting computing entity. In some embodiments, the specific intention has been encrypted by the broadcasting computing entity. In such embodiments, listening computing entity 12b decrypts the specific intention using an encryption algorithm used to encrypt the specific intention by the broadcasting computing entity.

If, at step 54, listening computing entity 12b hears (i.e., receives) a specific intention that meets a criterion of listening computing entity 12b, then method 30 continues to step 56, where listening computing entity 12b compares the functional operation included in the specific intention broadcast by the broadcasting computing entity with a list of operational needs. If the functional operation is listed in the list of operational needs, then method 50 continues to step 58, where listening computing entity 12b subscribes to an output of the functional operation performed by the broadcasting computing entity. At step 60 listening computing entity 12b receives the output of the functional operation performed by the broadcasting computing entity. In some embodiments, the output of the functional operation is based on input data. Such input data can be provided by listening computing entity 12b or a local module, for example. In embodiments in which input data is provided by listening computing entity 12b, listening computing entity 12b transmits such input data to the broadcasting computing entity via the network. Then, after the broadcasting computing entity computes the output based on the input data transmitted to the broadcasting computing entity, such output will be provided to listening computing entity 12b.

Listening computing entity 12b then performs some action using the output of the functional operation received from broadcasting computing entity 12a. This action performed using the output of the functional operation is a part of the software solution of the system. Such an action is performed by listening computing entity 12b includes. This cooperation of broadcasting computing entity 12a and listening computing entity 12b is automatically performed using methods 30 and 50, without human intervention.

Deployment of an automated system can involve one or more computing entities, such as, for example, local computing entities 12a-12c (depicted in FIG. 1) as well as one or more modules, such as, for example, local modules 14a-14d (depicted in FIG. 1). Each of local computing entities 12a-12c and each of local modules 14a-14d are deployed for a reason—to perform some particular task or tasks. When a system involves multiple components, such as those depicted in FIG. 1, such components often need to communicate with one another and/or coordinate performance of their respective tasks. In the past, such communication and coordination has been accomplished by a developer writing custom software for the particular automated system requiring the specific combination of local computing entities 12a-12c and each of local modules 14a-14d. Using the above-described methods 30 and 50, such communication and coordination can be automated, without need for custom software development. Broadcasting of specific intentions (i.e., functional operations), of which a local computing module is capable to perform, makes known to listening computing entities that such operational functions are offered by the broadcasting computing entity, should it be helpful (e.g., listed on an operations list) to any listening computing entities. When a listening entity avails itself of an offered operational function, that listening computing entity offloads a portion of the tasks it needed to perform to another computing entity—the broadcasting computing entity. In this way, the computing effort (e.g., the tasks) of the entire automated system can distributed amongst the various components. Such a distribution can result in: i) a leveling of the computing effort performed by the various components; ii) the automatic finding of a broadcasting computing entity capable of performing a specific functional operation that a listening computing entity is incapable of or inefficient in performing itself; iii) an optimization in which tasks are performed by computing entities most capable of such performance (e.g., equipped with specific hardware to perform such tasks); and/or iv) elimination of redundant performance of tasks, should two or more listening computing entities response to a specific intention broadcasted.

Figure 5:
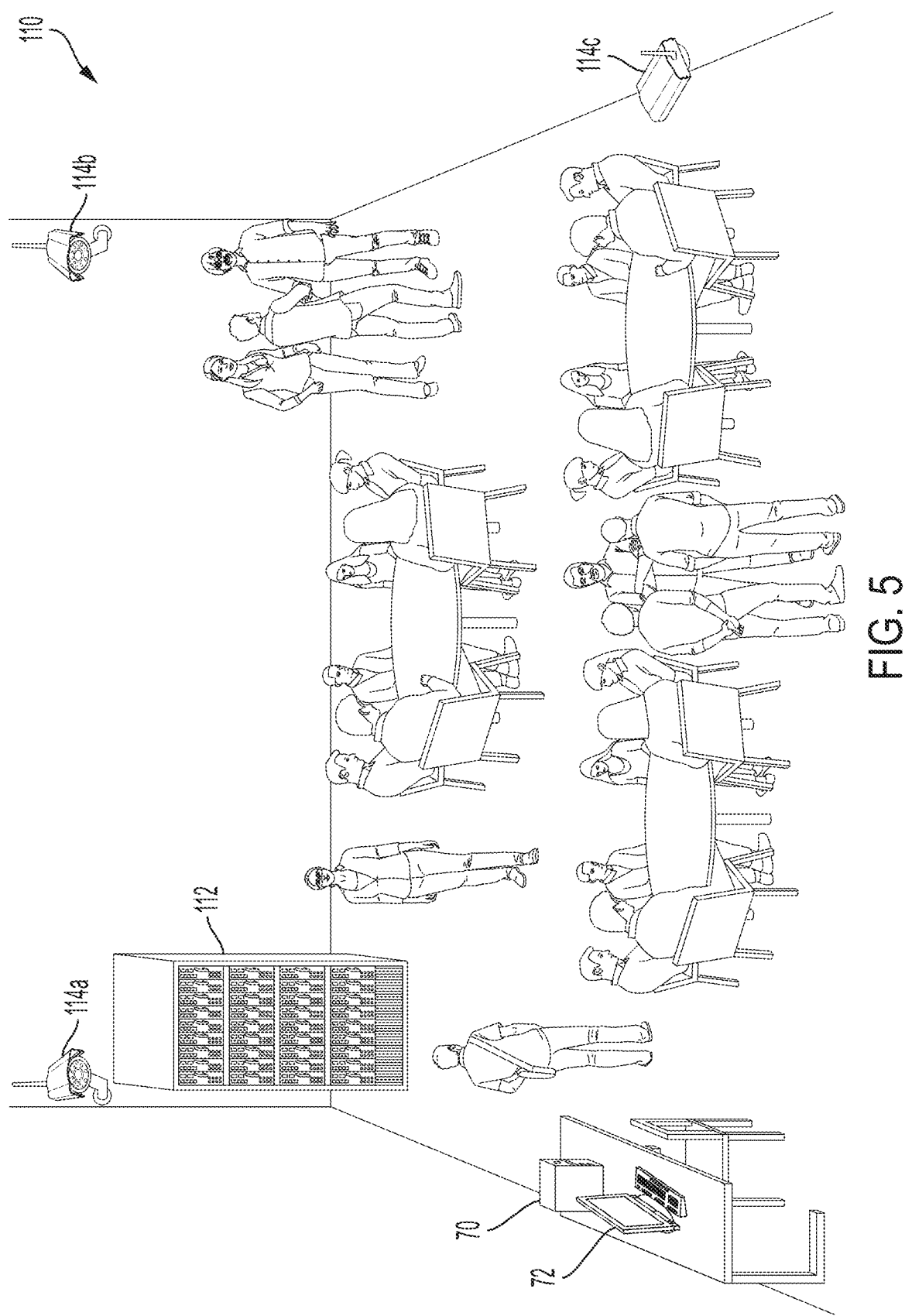
FIG. 5 is a schematic diagram of an imaging system in which a software solution is built in an automated fashion.

FIG. 5 is a schematic diagram of an imaging system in which a software solution is built in an automated fashion. In FIG. 5 imaging system 110 includes edge computer 112, cameras 114a-114c, user computer 70 and display screen 72. Edge computer 112 operates as a local computing entity, such as local computing entities 12a-12c, as depicted in FIG. 1. Cameras 114a-114c can operate as local modules, similar to local modules 14a-14d, as depicted in FIG. 1. Imaging system 110 has been deployed to monitor a crowd at a public facility. Some of the functional outputs of imaging system 110 include: i) a count of the number of persons in the public facility; and ii) determination of density of persons as a function of location. Imaging cameras 114a-114c are positioned in such a manner that the entire facility is imaged by at least one of imaging cameras 114a-114c.

Edge computer 112, when connected to the network, broadcasts its specific intention, which includes various functional operations, such as, for example, image correlation, person identification, counting algorithms, density algorithms, etc. User computer 70 is running an application that provides the functional outputs of: i) displaying the raw image data from any cameras imaging the public facility; ii) counting the numbers of persons at the public facility and provides an index of such a count; and iii) calculating the local densities of persons and annotating the displayed imagery to indicate areas of low and high densities. After listening to such a broadcast by edge computer 112 and receiving the specific intention broadcast, user computer 70 subscribes to the functional operations broadcast thereby.

Each of cameras 114a-114c, when connected to the network, broadcasts its specific intention, which includes providing streaming imagery of the scene aligned within its field of view. Cameras 114a-114c function as both a broadcasting computing entity and a local module in this embodiment. The broadcasting of the specific intentions is described above as an action of a computing entity, while the imaging of data is described above as an action of an image sensing module. Such combined functions are depicted in FIG. 1 with reference to local computing entity 12a and local module 14a.

Edge computer 112 subscribes to the streaming imagery broadcast by each of cameras 114a-114c, which will be used as inputs for the functional operations provided by edge computer 112. For example, edge computer 112 will correlate concurrent frames provided by cameras 114a-114c, so as to avoid double counting of persons who are simultaneously imaged by two or more of cameras 114a-114c. Edge computer 112 will then count persons and calculate the local densities of persons, and then provide functional outputs of such functional operations, which will be disseminated to any and all computing entities subscribing to such functional operations, such as user computer 70.

User computer 70 also subscribes to the streaming imagery broadcast by each of cameras 114a-114c, which will be displayed on display screen 70. User computer will display an index of the count of persons on the display screen as well as annotating the displayed imagery with indicia of local densities of person. All of the above-described coordination of tasks is performed automatically by the various computing entities of imaging system 110. No custom computer code is required for these separate entities-edge computer 112, cameras 114a-114c and user computer 70 to coordinate amongst themselves so as to provide functional outputs and obtain functional outputs needed for successful accomplishment of their tasks.

Figure 6:
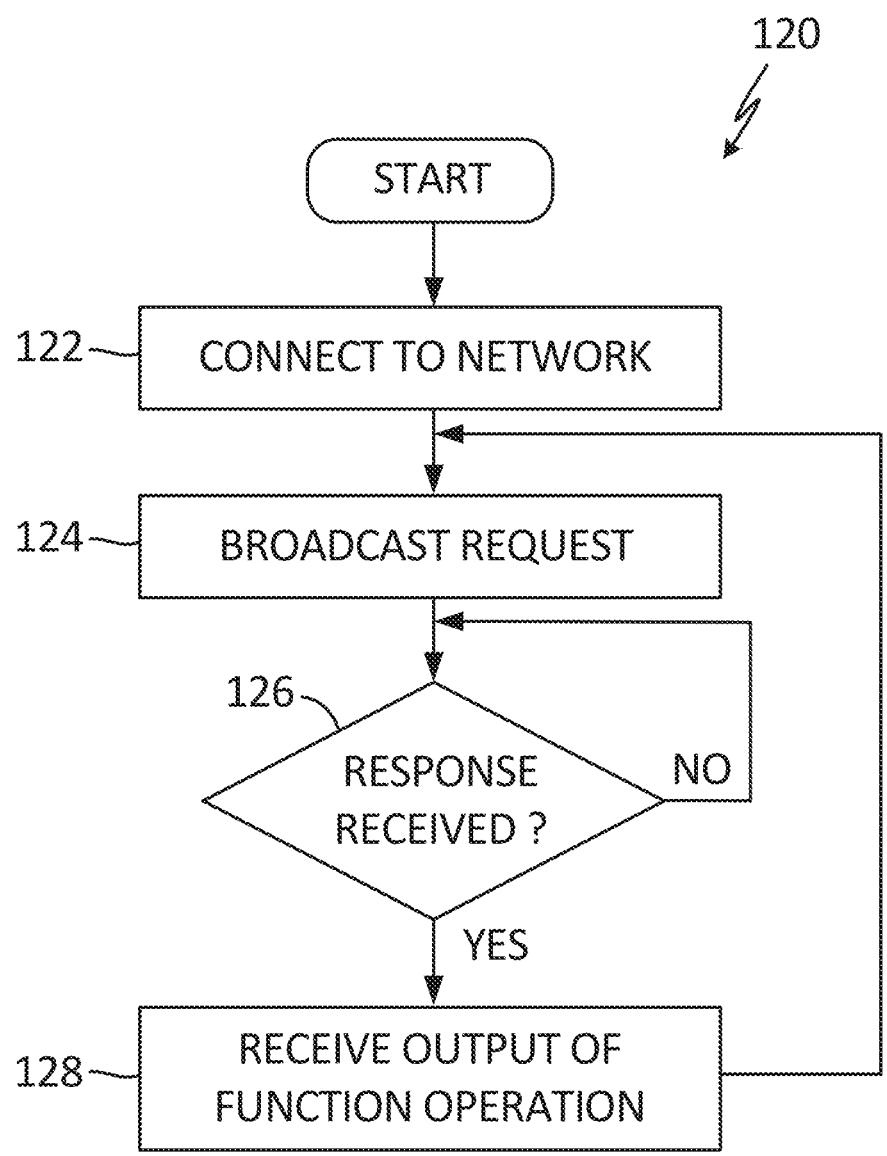
FIG. 6 is a flow chart of an embodiment of a method for requesting performance of a functional operation by other computing entities.

FIG. 6 is a flow chart of an embodiment of a method for requesting performance of a functional operation by other computing entities. In FIG. 6, method 120 is disclosed from the perspective of a broadcasting computing entity, such as broadcasting computing entity 12a depicted in FIG. 1. Method 120 begins at step 122, where broadcasting computing entity 12a connects to local network 16. Then, at step 124, broadcasting computing entity 12a broadcasts, via local network 16, a request for listening computing entities 12b or 12c to perform a functional operation. In some embodiments, the broadcast can further include instructions for listening entities 12b and 12c to communicate with broadcasting computing entity 12a. In some embodiments, broadcasting computing entity 12a encrypts the specific intention using an encryption algorithm known to both broadcasting computing entity 12a and listening computing entities 12b and 12c.

At step 126, broadcasting computing entity 12a waits to receive a response to the request from a capable one of the listening computing entities 12b or 12c, via network 16. The response can indicate that the capable one of listening computing entities 12b or 12c has determined itself capable of performing the functional operation requested. A response can further include information regarding publication and subscription of an output of the functional operation after being performed by the capable listening computing entity 12b or 12c. If more than one response is received, such as, for example, if both listening computing entities 12b and 12c respond indicating capability, then broadcasting computing entity 12a can select one or both of listening computing entities 12b and 12c to perform the functional operation. Broadcasting computing entity 12a can, for example, transmit a reply to the response indicating which of listening computing entities 12b and 12c has been selected.

If a response is received at step 126, then method 120 advances to step 128, where broadcasting computing entity 12a receives the output of the functional operation performed by the capable one of listening computing entities 12b and 12c. After receiving the output at step 128, method 120 returns to step 124 and broadcasts the same request again or another request for one of listening computing entities 12b and 12c to perform another functional operation. In some embodiments, especially those in which the functional operation is repeatedly performed, such a video image capture or ongoing monitoring, instead of or in addition to returning to step 124 after step 128, method 120 will remain at step 128 obtaining outputs of such a repeatedly performed functional operation.

In some embodiments, the output of the functional operation is based on input data. Such input data can be provided by broadcasting computing entity 12a, listening computing entity 12b or 12c, or one of local modules 14a-14c, for example. In embodiments in which input data is provided by broadcasting computing entity 12a, broadcasting computing entity 12a transmits such input data to the capable listening computing entity 12b or 12c via network 16. Then, the capable one of listening computing entities 12b and 12c computes the output based on the input data received from broadcasting computing entity 12a. In other embodiments, one of listening computing entities 12b and 12c or one of local modules 14a-14d can provide input data to the capable listening computing entity 12b or 12c so as to have the capable listening computing entity 12b or 12c compute the output of the functional operation requested. In such an embodiment, the listening computing entity 12b or 12c or the local module 14a-14d that provides such data transmits it to the capable one of listening computing entity 12b and/or 12c. In some embodiments the selected functional operation can require input data from more than one entity.

Using the methods of method 30, the capable listening computing entity 12b or 12c performs a part of the software solution in cooperation with broadcasting computing entity 12a. The part performed by the capable listening computing entity 12b or 12c includes, at least, performance of the functional operation. Broadcasting computing entity 12a then uses the output of the functional operation to perform an action that is part of the software solution.

Figure 7:
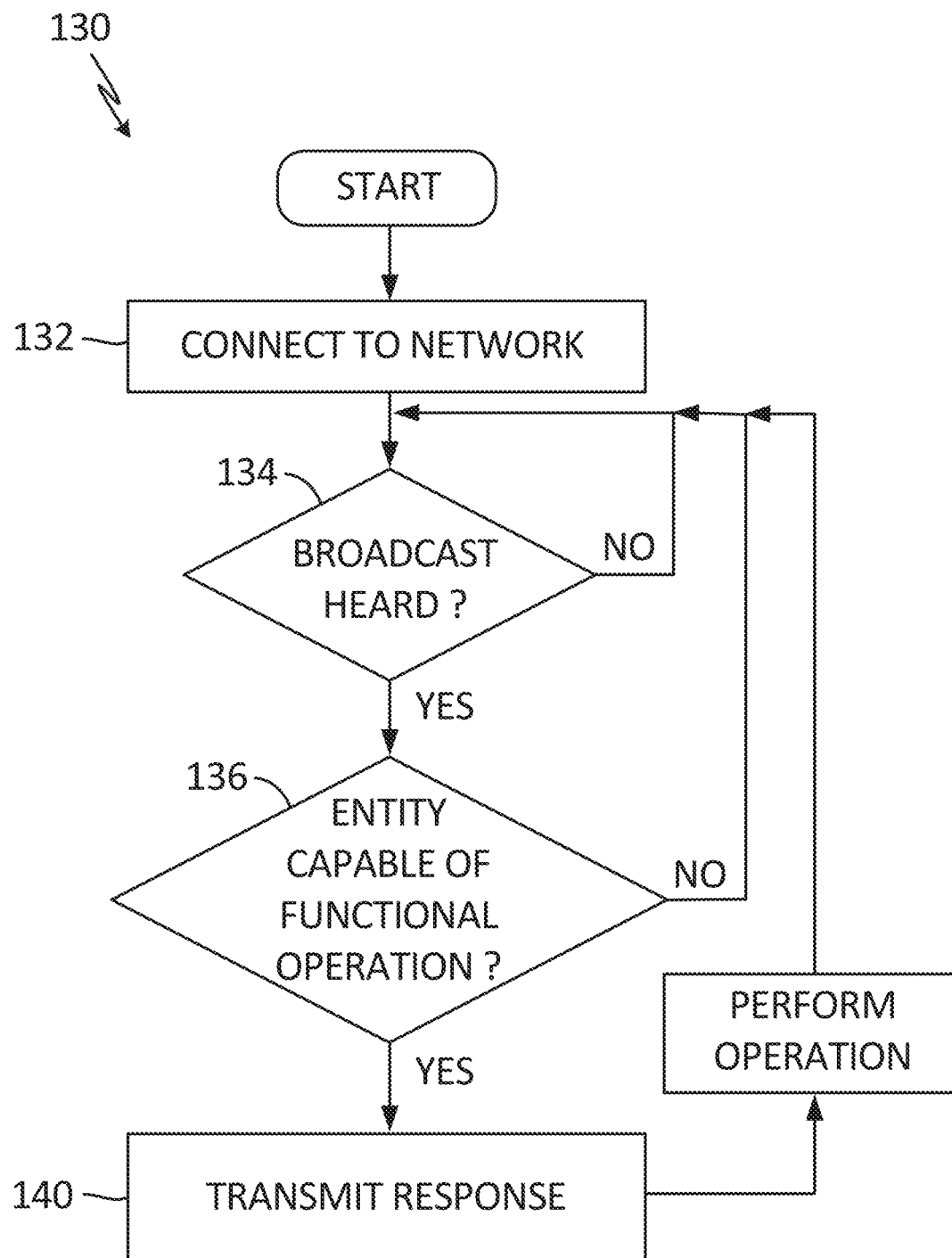
FIG. 7 is a flow chart of an embodiment of a method for performing a functional operation for other computing entities in response to a request for such performance.

FIG. 7 is a flow chart of an embodiment of a method for performing a functional operation for other computing entities in response to a request for such performance. In FIG. 7, method 130 is disclosed from the perspective of a listening computing entity, such as listening computing entity 12b depicted in FIG. 1. Method 130 begins at step 132, where listening computing entity 12b connects to a network. At step 134 listening computing entity 12b listens, via the network, for a request to perform a functional operation transmitted by broadcasting computing entity 12a (or another broadcasting computing entity). In some embodiments, the request can include instructions for listening entity 12b to communicate with broadcasting computing entity 12a. In some embodiments, the request has been encrypted by broadcasting computing entity 12a. In such embodiments, listening computing entity 12b decrypts the request using an encryption algorithm used to encrypt the specific intention by broadcasting computing entity 12a. If, at step 134 listening computing entity 12b hears (i.e., receives) such a request, then method 130 advances to step 136, where listening computing entity 12b determines whether it is capable of performing the functional operation indicated by the request.

If, at step 136, listening computing entity 12b determines itself capable of performing the functional operation requested, then method 130 continues to step 138, where listening computing entity 12b responds to the request indicating itself capable of performing the functional operation. If, however, at step 136, listening computing entity does not determine itself capable of performing the functional operation requested, then method 130 returns to step 134, where listening computing entity 12b listens, via the network, for a request to perform a functional operation transmitted by a broadcasting computing entity. After step 138, method 130 continues to step 140, where listening computing entity 12b performs the functional operation requested and transmits an output of the functional operation to broadcasting computing entity 12a.

In some embodiments, the output of the functional operation is based on input data. Such input data can be provided by broadcasting computing entity 12a or by another local module, for example. In embodiments in which input data is provided by broadcasting computing entity 12a, listening computing entity 12b receives such input data from broadcasting computing entity 12a via network 16. Then, after listening computing entity 12b computes the output based on the input data received from broadcasting computing entity 12a, such output will be provided to broadcasting computing entity 12a.

Broadcasting computing entity 12a then performs some action using the output of the functional operation received from listening computing entity 12b. This action performed using the output of the functional operation is a part of the software solution of the system. This cooperation of broadcasting computing entity 12a and listening computing entity 12b is automatically performed using methods 120 and 130, without human intervention.

Figure 8:
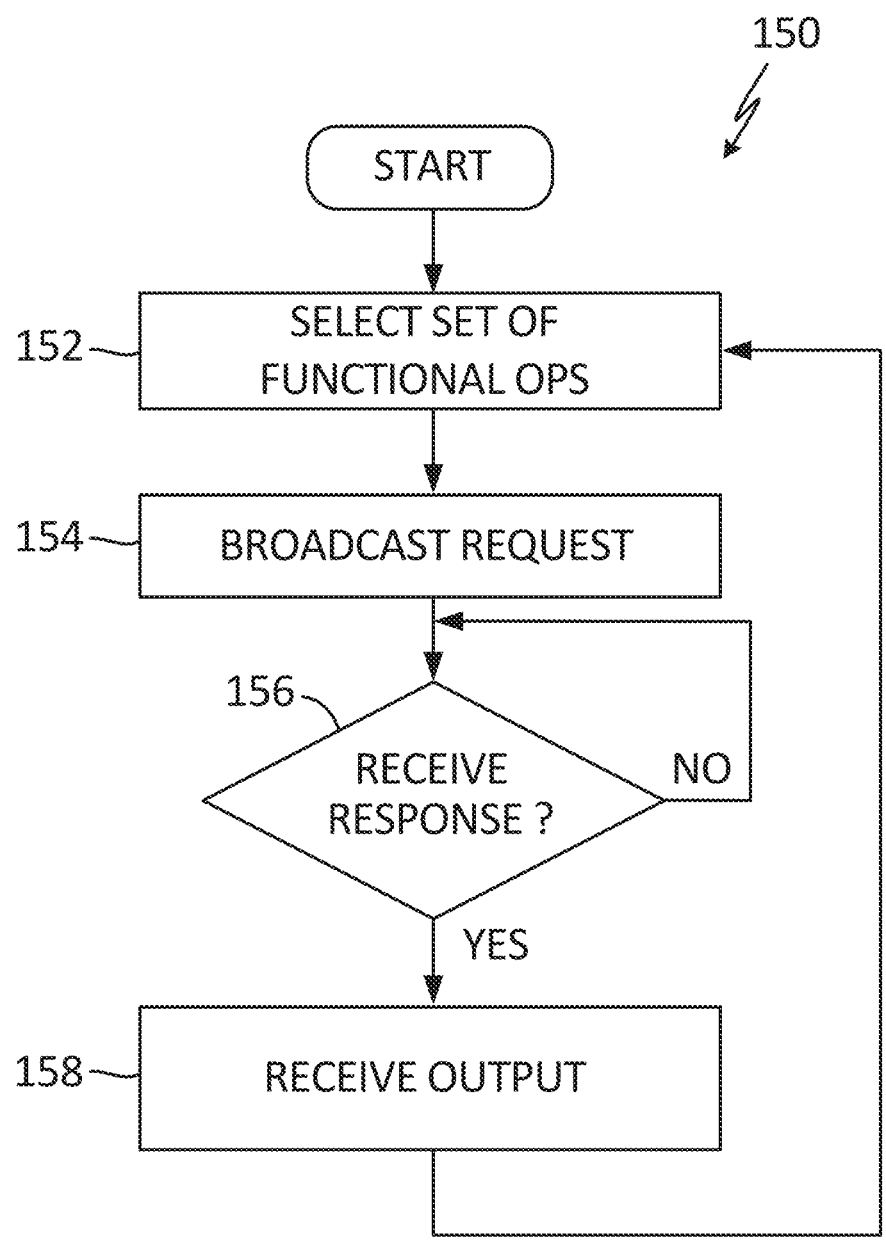
FIG. 8 is a flow chart of an embodiment of a method for requesting performance of a set of functional operations by other computing entities.

FIG. 8 is a flow chart of an embodiment of a method for requesting performance of a set of functional operations by other computing entities. In FIG. 8, method 150 is disclosed from the perspective of a broadcasting computing entity, such as broadcasting computing entity 12a depicted in FIG. 1. Method 150 begins at step 152, where broadcasting computing entity 12a selects a selected set of functional operations from one or more sets of functional operations associated with the software solution. The selected set represent a plurality of functional operations that are sequentially performed so as to generate an output. Broadcasting computing entity can then perform an action, based on the output generated by performing each of functional operations in the selected set. This set of functional operations can be thought of as a recipe to obtain such an output.

Various criterial can be used by broadcasting computing entity 12a in selecting the selected set of functional operations. For example, broadcasting computing entity 12a might have been deployed to perform these one or more sets of functional operations, which are associated with the software solution. Broadcasting computing entity 12a might have insufficient capacity to perform all of these one or more sets of functional operations, and therefore must engage one or more of listening computing entities 12b and 12c, which has/have available capacity to perform these one or more of these sets of functional operations, so as to offload some workload for broadcasting computing entity 12a.

In other embodiments, one of the sets of functional operations might best be performed by a computing entity with special purpose hardware, such as, for example, a graphical processing unit. Broadcasting computing entity 12a then might engage one or more of listening computing entities 12b and 12c, which is/are equipped with such special purpose hardware.

In still other embodiments, broadcasting computing entity 12a might have, over time, assumed responsibility for performing so many sets of functional operations that now broadcasting computing entity 12a might be operating near its workload capacity. Broadcasting computing entity 12a might compare its workload with a predetermined fraction of its workload capacity. If broadcasting computing entity 12a determines that its workload exceeds such a predetermined fraction of its workload capacity, broadcasting computing entity 12a then might engage one of listening computing entities 12b and 12c, which is operating at a lower fraction of its workload.

Regardless of the criteria used at step 152 in selecting the selected set of functional operations, method 150 advances to step 154, where broadcasting computing entity broadcasts a request to perform each of the functional operations in the selected set. In some embodiments, broadcasting computing entity 12a encrypts the request using an encryption algorithm known to both broadcasting computing entity 12a and listening computing entities 12b and 12c. Such a broadcast can be heard by listening computing entities 12b and 12c by way of their common network connections.

At step 156, broadcasting computing entity 12a waits to receive a response to the request from a capable one of the listening computing entities 12b and/or 12c, via network 16. Then if one of listening computing entities 12b and 12c determines itself capable of performing each of the functional operations in the selected set, then, at step 156, broadcasting computing entity will receive a response indicating from such a capable listening computing entity that it is capable of performing each of the functional operations in the selected set. A response can further include information regarding publication and subscription of an output of the functional operation after being performed by the capable listening computing entity 12b and/or 12c.

If more than one response is received, such as, for example, if both listening computing entities 12b and 12c respond, then broadcasting computing entity can select one or both of listening computing entities 12b and 12c to perform the selected set of functional operations. Broadcasting computing entity can, for example, transmit a reply to the response indicating which of listening computing entities 12b and 12c is selected. Various criteria can be used by broadcasting computing entity to select which of the capable subset of listening computing entities 12b and 12c for performing the selected set of functional operations. For example, each of listening computing entities can include in its response indication of its workload availability (e.g., the amount of computing capacity available for performing such a selected set of functional operations). In some embodiments, each of listening computing entities can include in its response indication of any special purpose hardware with which it is equipped. Such indications can be used as selection criteria by broadcasting computing entity 12a.

If a response is received at step 156, then method 150 advances to step 158, where broadcasting computing entity 12a receives the output generated by performance of the set of functional operations by the capable one of listening computing entities 12b and 12c. After receiving the output at step 158, method 150 returns to step 152, where broadcasting computing entity 12a can select the same selected set or another selected set of functional operations for another request of listening computing entities 12b and 12c. In some embodiments, especially those in which the selected set of functional operations is repeatedly performed or an ongoing activity, such as video image capture, instead of or in addition to returning to step 152 after step 158, method 150 will remain at step 158 so as to continue obtaining outputs of such a repeatedly performed set of functional operations.

In some embodiments, the output of the functional operation is based on input data. Such input data can be provided by broadcasting computing entity 12a, one of listening computing entities 12b and 12c, or one of local modules 14a-14d. In embodiments in which input data is provided by broadcasting computing entity 12a, broadcasting computing entity 12a transmits such input data to the capable listening computing entity 12b or 12c via network 16. Then, the capable listening computing entity 12b or 12c computes the output based on the input data received from broadcasting computing entity 12a and according to the recipe represented by the set of functional operations provided by broadcasting computing entity 12a. In another embodiment, listening computing entities 12b or 12c or local modules 14a-14d can provide input data to the capable listening computing entity 12b or 12c so as to have the capable listening computing entity 12b or 12c compute the output of the functional operation requested. In such an embodiment, local computing entity 12b or 12c or local modules 14a-14d that provides such data transmits it to the capable one of listening computing entity 12b or 12c. Such a transmission can be direct or can be performed using publication/subscription services, for example. In some embodiments the selected set of functional operations requires input data from more than one entity.

Using the methods of method 150, the capable listening computing entity 12b or 12c performs a part of the software solution in cooperation with broadcasting computing entity 12a. The part performed by the capable listening computing entity 12b or 12c includes, at least, performance of each of the functional operations in the selected set. Broadcasting computing entity 12a then uses the output of the selected set of functional operations to perform an action that is part of the software solution.

Figure 9:
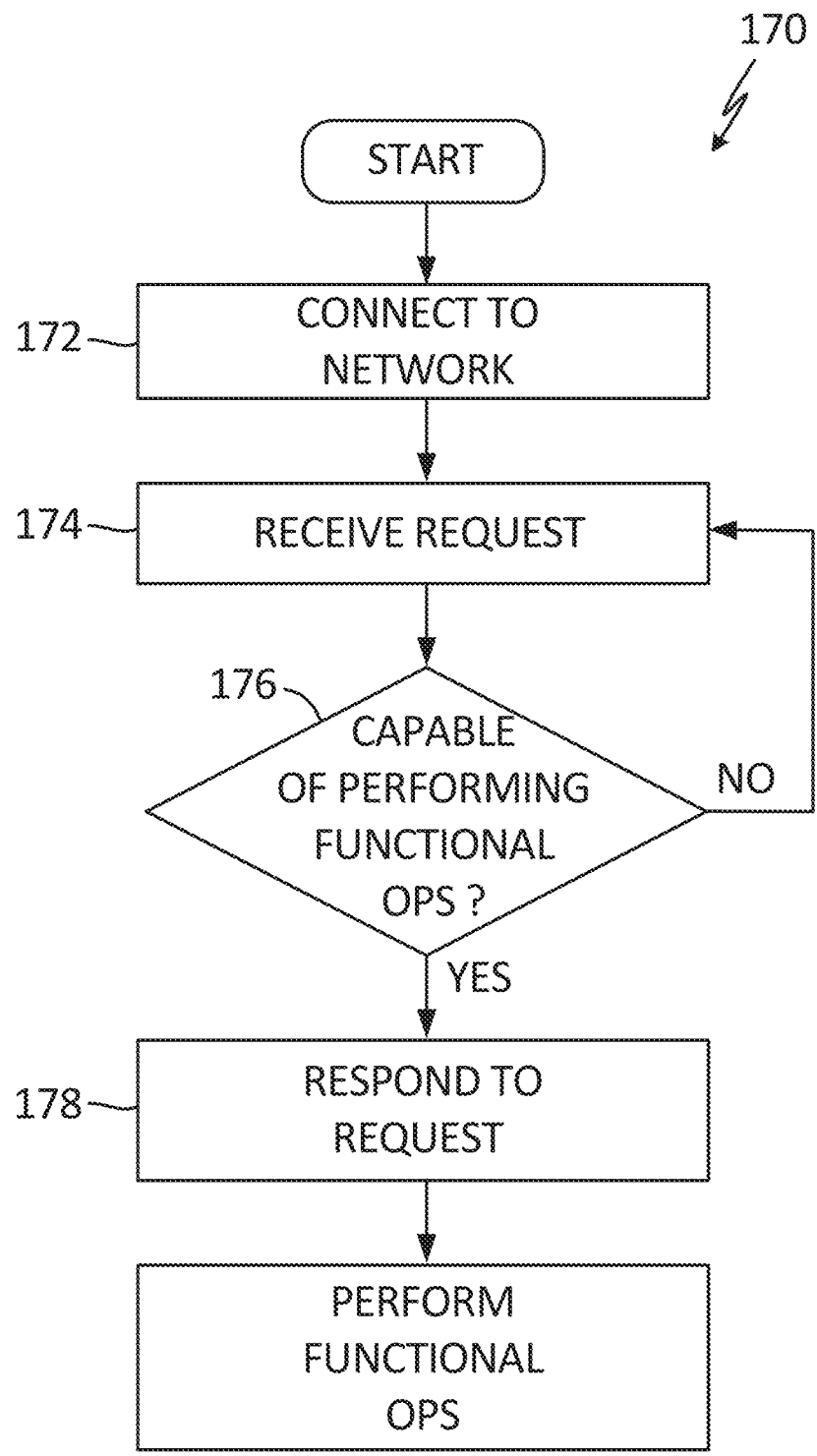
FIG. 9 is a flow chart of an embodiment of a method for performing each of a set of functional operations for other computing entities in response to a request for such performance.

FIG. 9 is a flow chart of an embodiment of a method for performing each of a set of functional operations for other computing entities in response to a request for such performance. In FIG. 9, method 170 is disclosed from the perspective of a listening computing entity, such as listening computing entity 12b depicted in FIG. 1. Method 170 begins at step 172, where listening computing entity 12b connects to a network. At step 174 listening computing entity 12b listens, via the network, for a request to perform a selected set of functional operations transmitted by broadcasting computing entity 12a (or another broadcasting computing entity). In some embodiments, the request can include instructions for listening entity 12b to communicate with broadcasting computing entity 12a. In some embodiments, the request has been encrypted by broadcasting computing entity 12a. In such embodiments, listening computing entity 12b decrypts the request using an encryption algorithm used to encrypt the specific intention by broadcasting computing entity 12a. If, at step 174 listening computing entity 12b hears (i.e., receives) such a request, then method 170 advances to step 176, where listening computing entity 12b determines whether it is capable of performing each of the functional operations in the selected set indicated by the request.

If, at step 176, listening computing entity 12b determines itself capable of performing each of the functional operations in the selected set, then method 170 continues to step 178, where listening computing entity 12b responds to the request indicating itself capable of performing each of the functional operations in the selected set. If, however, at step 176, listening computing entity does not determine itself capable of performing each of the functional operations in the selected set, then method 170 returns to step 174, where listening computing entity 12b listens, via the network, for a request to perform a selected set of functional operations transmitted by broadcasting computing entity 12a. After step 138, method 170 continues to step 180, where listening computing entity 12b performs each of the functional operations in the selected set and transmits an output of the set of functional operations to broadcasting computing entity 12a.

In some embodiments, the output of the functional operation is based on input data. Such input data can be provided by broadcasting computing entity 12a or by another local module, for example. In embodiments in which input data is provided by broadcasting computing entity 12a, listening computing entity 12b receives such input data from broadcasting computing entity 12a via network 16. Then, after listening computing entity 12b computes the output based on the input data received from broadcasting computing entity 12a, such output will be provided to broadcasting computing entity 12a.

Broadcasting computing entity 12a then performs some action using the output of the functional operation received from listening computing entity 12b. This action performed using the output of the functional operation is a part of the software solution of the system. This cooperation of broadcasting computing entity 12a and listening computing entity 12b is automatically performed using methods 150 and 170, without human intervention.

While the invention has been described with reference to an exemplary embodiment, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A system to automate building a software solution that is cooperatively performed, the system comprising:
a plurality of listening computing entities connected to a network; and
a broadcasting computing entity connected to the network, the broadcasting computing entity configured to:
broadcast, to each of the plurality of listening computing entities via the network, an announcement of a functional operation of which the broadcasting computing entity is capable, wherein each of the plurality of listening computing entities is configured to:
receive the announcement of the functional operation of which the broadcasting computing entity is capable; and
compare the functional operation of which the broadcasting computing entity is capable with a list of operational needs, wherein, in response to the functional operation being listed in the list of operational needs, a subscribing one of the plurality of listening computing entities is further configured to:
transmit a response to the announcement received indicating subscription to an output of the functional operation of which the broadcasting computing entity is capable, wherein the broadcasting computing entity is further configured to:
receive, from the subscribing one of the plurality of listening computing entities, the response indicating subscription to the output of the functional operation of which the broadcasting computing entity is capable;
perform the functional operation of which the broadcasting computing entity is capable, thereby generating the output of the functional operation; and
transmit the output of the functional operation performed by the broadcasting computing entity, wherein the subscribing one of the plurality of listening computing entities is further configured to:
receive, from the broadcasting computing entity, the output of the functional operation performed by the broadcasting computing entity; and perform an action using the output of the functional operation performed by the broadcasting computing entity, thereby cooperatively performing at least a part of the software solution.

2. The system of claim 1, wherein either the announcement by the broadcasting computing entity or the response by the subscribing one of the plurality of listening computing entities includes instructions for communicating data between the broadcasting computing entity and the subscribing one of the plurality of listening computing entities.

3. The system of claim 2, wherein the instructions for communicating data between the broadcasting computing entity and the subscribing one of the plurality of listening computing entities includes instructions for publishing and/or subscribing to provide the output of the functional operation performed by the broadcasting computing entity to the subscribing one of the plurality of listening computing entities.

4. The system of claim 1, wherein the broadcasting computing entity is further configured to:
encrypt the announcement of a functional operation of which the broadcasting computing entity is capable using an encryption algorithm known to each of the plurality of listening computing entities.

5. The system of claim 4, wherein each of the plurality of listening computing entity is further configured to:
decrypt the announcement of a functional operation of which the broadcasting computing entity is capable using an encryption algorithm used to encrypt the request by the broadcasting computing entity.

6. The system of claim 1, wherein the output of the functional operation is generated based on input data provided by a local module.

7. The system of claim 1, further comprising:
a sensor for obtaining the input data.

8. The system of claim 1, wherein broadcasting computing entity determines capability of performing the functional operation by:
comparing the functional operation with a list of operational capabilities of which that broadcasting computing entity is capable.

9. The system of claim 1, wherein the broadcasting computing entity is further configured to:
periodically broadcast the announcement of the functional operation of which the broadcasting computing entity is capable, thereby permitting listening computing entities that are later connected to the network to find broadcasting computing entities that provide operations that are on their list of operational needs.

10. The system of claim 1, wherein the output of the functional operation is generated based on input data provided by a local module.

11. A method to automate building a software solution that is cooperatively performed, the method comprising:
connecting a broadcasting computing entity to a network;
broadcasting, by the broadcasting computing entity to each of a plurality of listening computing entities connected to the network, an announcement of a functional operation of which the broadcasting computing entity is capable;
receiving, by each of the plurality of listening computing entities, the announcement of the functional operation of which the broadcasting computing entity is capable;
comparing, by each of the plurality of listening computing entities, the functional operation of which the broadcasting computing entity is capable with a list of operational needs;
transmitting, in response to a subscribing one of the plurality of listening computing entities finding the functional operation being listed in the list of operational needs, a response to the announcement received indicating subscription to an output of the functional operation of which the broadcasting computing entity is capable;
receiving, by the broadcasting computing entity, the response indicating subscription to the output of the functional operation of which the broadcasting computing entity is capable from the subscribing one of the plurality of listening computing entities;
performing, by the broadcasting computing entity, the functional operation of which the broadcasting computing entity is capable, thereby generating the output of the functional operation; and
transmitting, by the broadcasting computing entity, the output of the functional operation performed, wherein in response to the subscribing one of the plurality of listening computing entities subscribing to the output of the functional operation performed by the broadcasting computing entity, the method further comprises:
receiving, by the subscribing one of the plurality of listening computing entities, the output of the functional operation performed by the broadcasting computing entity; and performing, by the subscribing one of the plurality of listening computing entities, an action using the output of the functional operation performed by the broadcasting computing entity, thereby cooperatively performing at least a part of the software solution.

12. The method of claim 11, wherein either the announcement by the broadcasting computing entity or the response by the subscribing one of the plurality of listening computing entities includes instructions for communicating data between the broadcasting computing entity and the subscribing one of the plurality of listening computing entities.

13. The method of claim 12, wherein the instructions for communicating data between the broadcasting computing entity and the subscribing one of the plurality of listening computing entities includes instructions for publishing and/or subscribing to provide the output of the functional operation performed by the broadcasting computing entity to the subscribing one of the plurality of listening computing entities.

14. The method of claim 11, further comprising:
encrypting, by the broadcasting computing entity, the announcement of a functional operation of which the broadcasting computing entity is capable using an encryption algorithm known to each of the plurality of listening computing entities.

15. The method of claim 14, further comprising:
decrypting, by each of the plurality of listening computing entities, the announcement of a functional operation of which the broadcasting computing entity is capable using an encryption algorithm used to encrypt the request by the broadcasting computing entity.

16. The method of claim 11, wherein the output of the functional operation is generated based on input data provided by a local module.

17. The method of claim 11, further comprising:
obtaining the input data using a sensor.

18. The method of claim 11, wherein broadcasting computing entity determines capability of performing the functional operation by:
comparing the functional operation with a list of operational capabilities of which that broadcasting computing entity is capable.

19. The method of claim 11, further comprising:
periodically broadcasting the announcement of the functional operation of which the broadcasting computing entity is capable, thereby permitting listening computing entities that are later connected to the network to find broadcasting computing entities that provide operations that are on their list of operational needs.

20. The method of claim 11, wherein the output of the functional operation is generated based on input data provided by a local module.

* * * * *